Aug. 14, 1945.  G. A. DONATH  2,382,367

GRID PASTING MACHINE

Filed Feb. 28, 1941  4 Sheets-Sheet 1

Inventor
George A. Donath
By Lyon & Lyon
Attorneys

Aug. 14, 1945. G. A. DONATH 2,382,367
GRID PASTING MACHINE
Filed Feb. 28, 1941 4 Sheets-Sheet 2
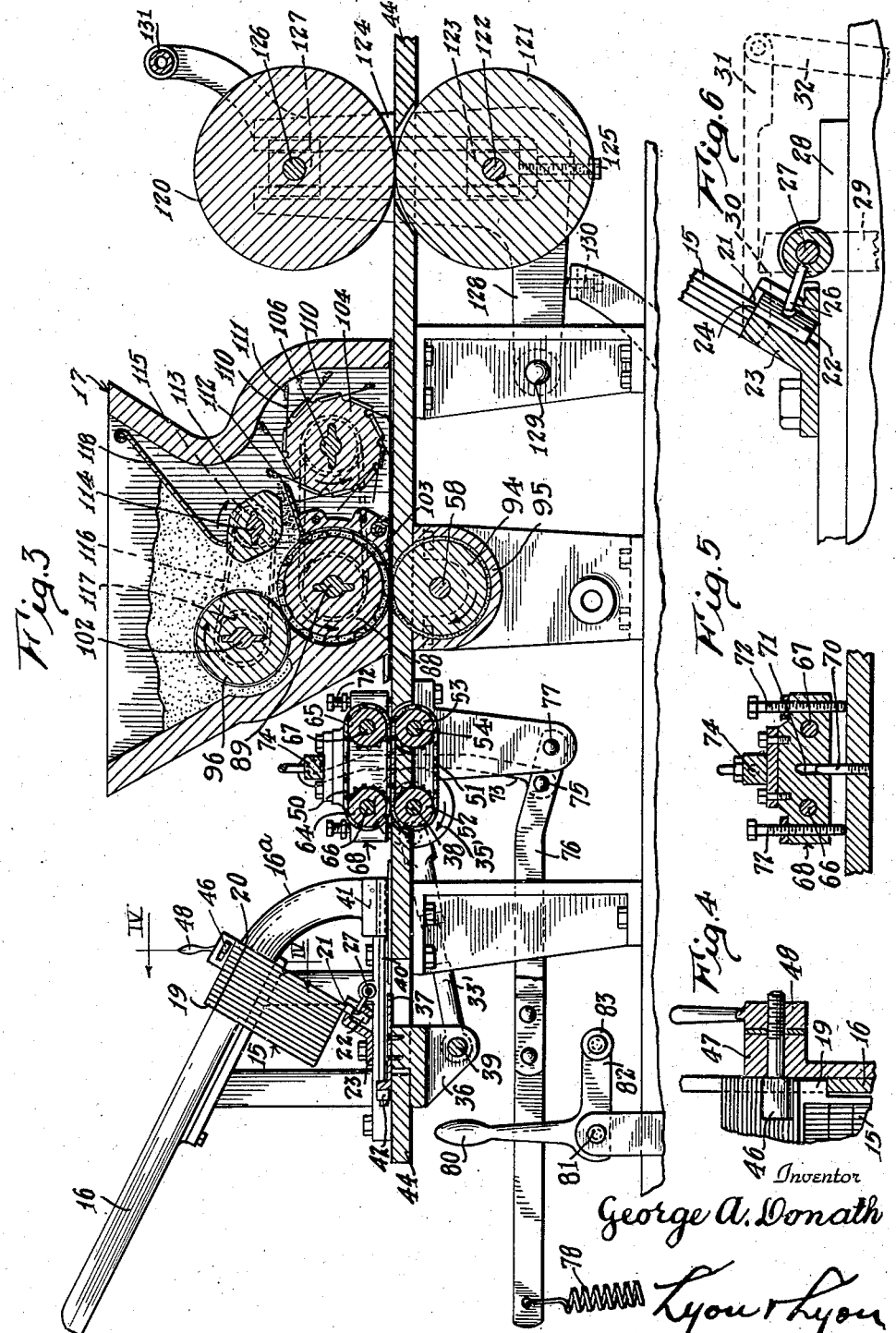
Inventor
George A. Donath
By Lyon & Lyon
Attorneys

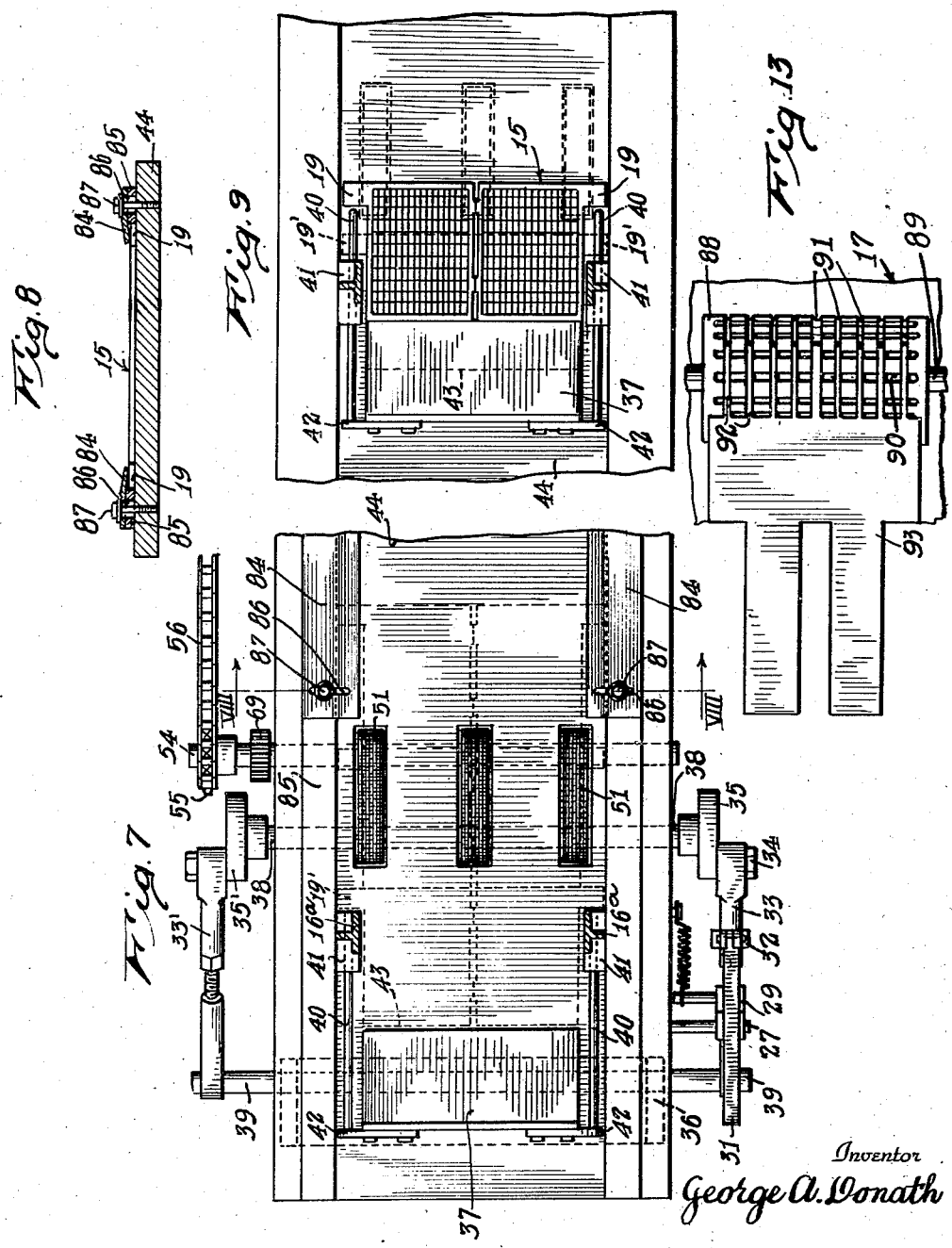

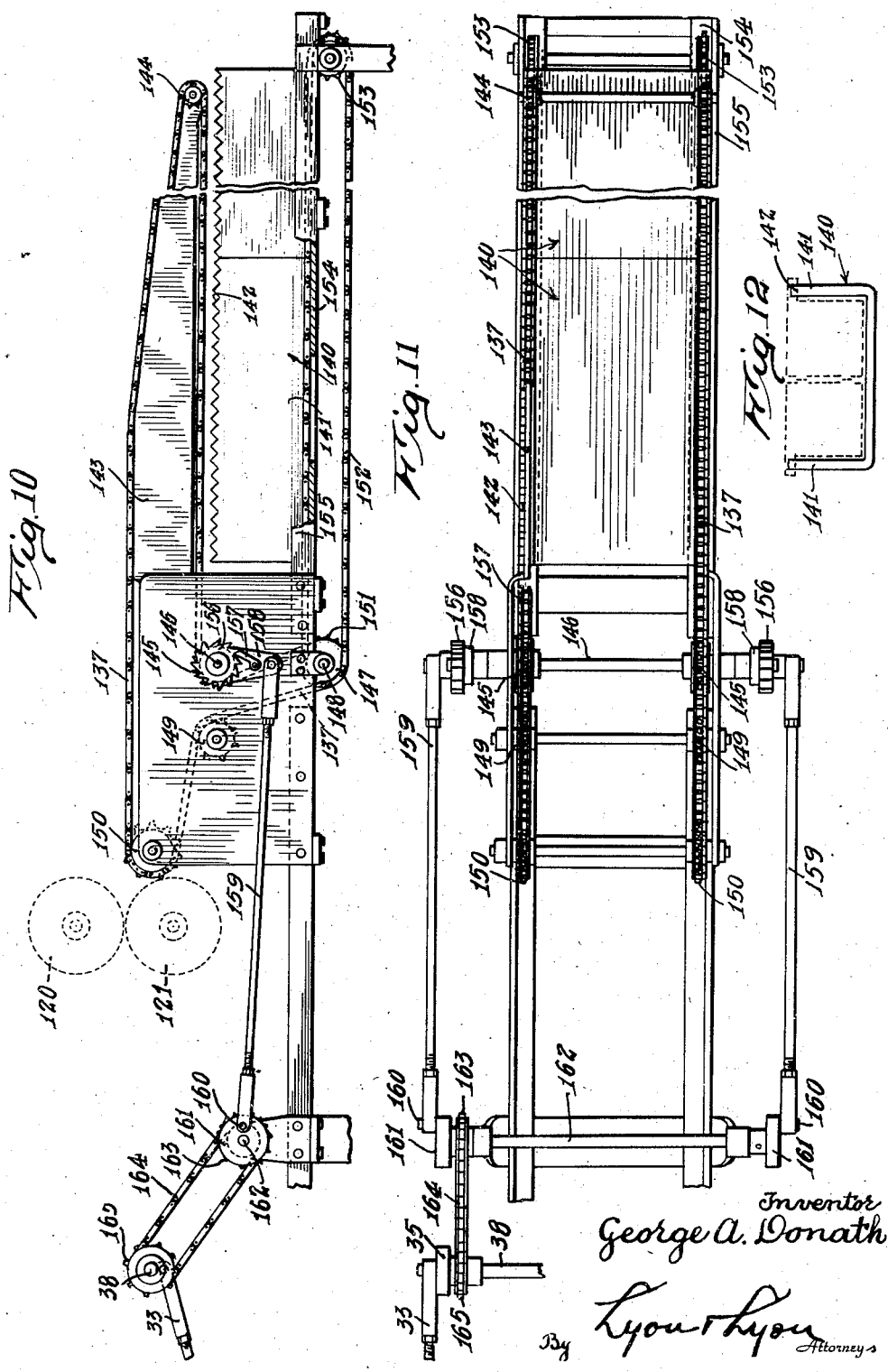

Patented Aug. 14, 1945

2,382,367

UNITED STATES PATENT OFFICE 2,382,367

GRID PASTING MACHINE

George A. Donath, Los Angeles, Calif.

Application February 28, 1941, Serial No. 380,986

7 Claims. (Cl. 226—39.6)

This invention relates to machines for making storage battery plates and has more particularly to do with the placing of the active material in paste form on the lead grids that constitute the frames of the plates.

An object of the invention is to provide a grid-pasting machine that is automatic in operation.

Another object is to provide a grid-pasting machine that is particularly effective in applying the paste to the grids in tightly adhering relation and with a smooth, exterior surface.

Another object is to provide a grid-pasting machine that is easily operated and serviced.

Other more specific objects and features of the invention will appear from the detailed description to follow of a preferred embodiment, as shown in the drawings.

In the drawings:

Fig. 3 is a longitudinal vertical section through the machine, the section being indicated by the broken line III—III of Fig. 2;

Fig. 4 is a detail section, taken along the line IV—IV of Fig. 3;

Fig. 5 is a detail, vertical section, taken along the line V—V of Fig. 2;

Fig. 6 is a detail, vertical section, taken along the line VI—VI of Fig. 2;

Fig. 7 is a detail, horizontal section, taken along the line VII—VII of Fig. 1;

Fig. 8 is a detail, vertical section, taken along the line VIII—VIII of Fig. 7;

Fig. 9 is a detail view, taken in the same plane as Fig. 7, but showing the apparatus in a different position of operation;

Fig. 10 is a side elevation of a grid-racking mechanism for racking pasted grids as they are delivered from the machine;

Fig. 11 is a plan view of the racking mechanism;

Fig. 12 is an end elevation view of one of the grid racks shown in Figs. 10 and 11; and Fig. 13 is a detail view of the underside of the hopper as it appears when removed from the machine.

Figure 1:
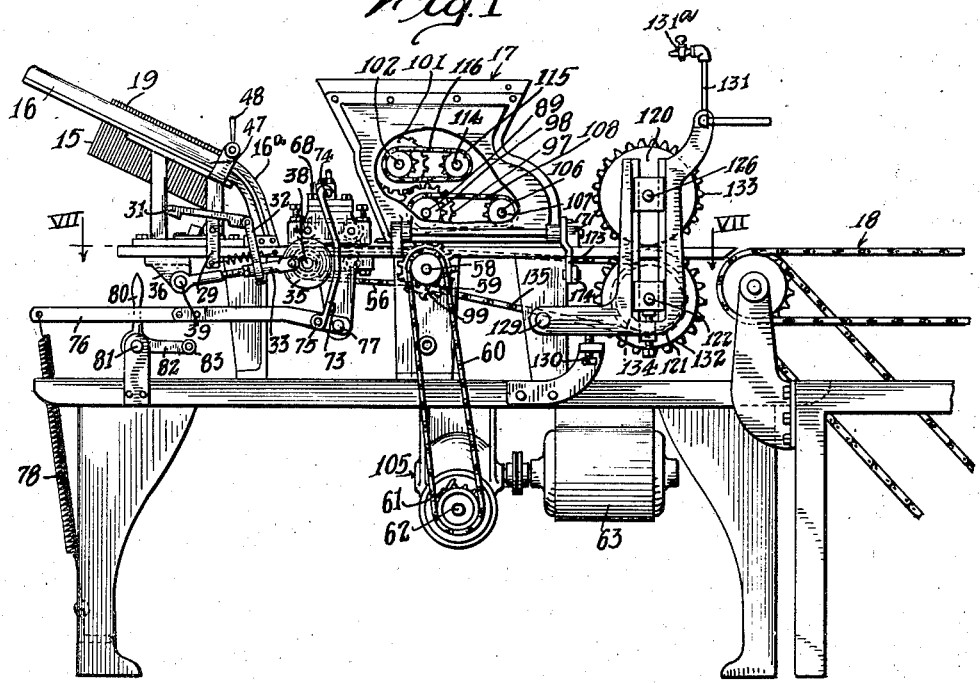
Fig. 1 is a side elevation of a grid-pasting machine in accordance with the invention.

Referring first to Fig. 1, grids 15 to be pasted are delivered to a pair of rack rails 16 on the input end of the machine, from which they are fed automatically one at a time through the machine. During their transit through the machine, the grids are fed below a hopper 17 containing paste which is to be applied to the grid, and a mechanism within and at the bottom of the hopper fills the interstices in the grids with the paste, after which the grids are fed out of the machine onto a conveyer 18.

One of the grids 15 is clearly shown in Fig. 9 and it will be observed that it comprises a substantially oblong reticulated plate having lugs 19 extending from each end. Referring to Fig. 1, the two rack rails 16 are spaced apart such a distance that the lugs 19 on the grids rest on the rails, and the bodies of the grids depend downwardly between the rails. The rails are inclined at such an angle that the grids slide downwardly therealong under the force of gravity except when they are restrained by a stop means, now to be described.

Referring to Fig. 3, each of the rails 16 is provided with a shoulder 20 against which the lugs 19 on the leading grid normally rest, thereby preventing the upper edge of the grid from advancing further. Furthermore, the lower edge of the front grid is prevented from forward movement out of the position shown in Fig. 3 by lips 21 (Fig. 6) on four push rods 22 which are slidably supported for movement in a direction parallel to the grid, in stationary guides 23. The under edge of the leading grid is engaged by the upper edge 24 of each push rod 22, so that when the push rod is elevated it will elevate the front grid but will not elevate the second grid. The four push rods 22 are adapted to be elevated periodically by arms 26 on an oscillatable shaft 27. Shaft 27 is supported in stationary bearings 28 (Fig. 3), and has on its front end an arm 29 (Figs. 1 and 6) which is adapted to be engaged and moved by a shoulder 30 on a link 31, which link rides on the upper end of the arm 29 and is pivotally secured at one end to the upper end of a member 32, which is secured to a connecting rod 33, which couples a crank pin 34 on a crank disc 35 to a shaft 39, which is connected by a bracket 36 to a grid-feeding slide 37 (Fig. 3). The crank disc 35 (Fig. 2) is mounted on the front ends of shaft 38, which extends clear across the machine, being supported in stationary bearings on the frame of the machine, and has a similar disc 35' on its opposite end which is likewise coupled by a connecting rod 33' to the shaft 39. The shaft 38 is rotated in a manner to be described later. Suffice it to say at this point that the rotation of the shaft reciprocates the grid-feeding slide 37 and the link 31 in synchronism, and each time the slide 37 approaches its most advanced position (to the right), the shoulder 30 (Fig. 6) on the link 31 engages the arm 29 and rocks the shaft 27 clockwise to lift the push rods 22 and carry the leading grid on the rack bars 16 upwardly a sufficient distance to move its lugs 19 clear of the shoulders 20, whereupon the leading grid inswings downwardly into horizontal position with its lugs 19' (Fig. 9) resting on top of a pair of rods 40, which are slidably supported for fore and aft movement in apertures provided therefor in frame elements 41 of the machine and are connected at their rear ends by connector plates 42 to the rear end of the slide 37. The grid newly dislodged from the rack rails 16 has its bottom edge resting on the slide 37, this bottom edge being indicated by the broken line 43 in Fig. 9.

The continuous rotation of the shaft 38 (Fig. 7) next reciprocates the slide 37 and the rods 40 rearwardly, but the newly deposited grid is prevented from moving with the slide, by engagement of its lugs 19' against the frame members 41 (Fig. 9). The rearward movement of the slide carries it past the rear edge 43 (Fig. 7) of the grid, and carries the front ends of the arms 40 rearwardly of the lugs 19' on the grid so that the front end of the grid drops down flat on the bed plate 44 of the machine. The slide 37 also rests on the bed plate and when it is next advanced it engages the rear edge 43 of the grid, and the front ends of the rods 40 engage the lugs 19', so that the grid is advanced into the position shown in full lines in Fig. 9, where it is seized by a chain conveyer to be described later and carried onward through the machine. While the grid is in the position shown in full lines in Fig. 9, a new grid is dislodged from the rack rails 16 and drops down into the position indicated in dotted lines in Fig. 9. As previously described, the lugs of the new grid drop onto the forwardly extending rods 40, which keep the new grid clear of the previously deposited grid until the latter has been carried forwardly by the chain conveyer.

To prevent possibility of two grids being simultaneously elevated clear of the shoulders 20 (Fig. 3) on the rack rails 16, a pair of adjustable stop members 46 are provided, one on each of the rails 16. These stop members 46 are carefully positioned to be clear of the leading grid, but to overlie the upper edges of the grid immediately back thereof. They prevent any possibility of the second grid being raised sufficiently for its lugs to clear the shoulder 20. The stops 46 are adjustably mounted in slots provided in brackets 47 (Fig. 4) secured to the rails 16, and are locked in position with handle nuts 48.

The chain conveyer means previously referred to for advancing the grids in the machine, includes a set of upper chains 50 (Fig. 3) and a set of lower chains 51. There are three chains in each set (the three lower chains are shown in Fig. 7). The lower chains 51 are stretched between sprockets 52 and 53. The sprockets 52 are mounted on the same shaft 38 that carries the connecting rod drive discs 35 and 35', previously mentioned. The sprockets 53 are mounted on a shaft 54, which is supported in stationary bearings and has on its rear side (Fig. 2) a sprocket 55 which is driven by a chain 56 from a sprocket 57 on a shaft 58. Shaft 58 extends through the machine and has on its front end a sprocket 59 (Fig. 1) coupled by a chain 60 to a sprocket 61 on a shaft 62. Sprocket 61 is rotated through a reduction gear box 105 from an electric motor 63.

The upper chains 50 (Fig. 3) are stretched between sprockets 64 and 65 on shafts 66 and 67, respectively, which shafts are rotatably supported in bearings in a removable frame member 68 (Fig. 5). Shaft 67 is rotated from shaft 54 by intermeshing gears on the rear ends of those shafts. The gear 69 on shaft 67 appears in Fig. 2.

To facilitate servicing and adjustment of the machine, the frame member 68 is adjustably and detachably mounted on the machine. Thus it is guided for vertical movement by dowel pins 70 (Fig. 5) on the frame of the machine, which slidably engage holes 71 in the member 68. Its vertical position is determined by adjusting screws 72 which limit downward movement of the member. It is normally held down by a pair of hooks 73 (Fig. 3) which engage opposite ends of a cross rod 74 which forms a part of the frame 68. The hooks 73 are pivotally connected at their lower ends, as by pins 75, to the forks of a bifurcated lever 76, which forks are fulcrumed at 77 to the main frame of the machine. The lever is normally urged downwardly by a tension spring 78 stretched between the left end of the lever and the frame of the machine. It will be apparent that the spring 78 yieldably urges the frame 68 downwardly and its exact vertical position is readily adjusted by turning the screws 72 (Fig. 5). When it is desired to remove the assembly including the frame 68, the lever 76 is swung upwardly by rocking one arm 80 of a bellcrank lever pivoted to the frame of the machine at 81 and having a second arm 82 with a roller 83 which engages the under side of lever 76 and swings it upwardly in response to counter-clockwise rocking of the arm 80. When the lever 76 has been elevated by the roller 83, the hooks 73 can be swung clear of the shaft 74, after which the entire assembly including the frame 68 can be lifted off the machine.

The conveyer chains 50 and 51 are relatively short in the direction of movement of the grids, but they engage the grids relatively tightly, and positively advance them. As each grid leaves the chains 50 and 51 it continues to slide along the bed plate 44, being pushed therealong by the grids that follow it.

During their movement after leaving the conveyer chains 50 and 51, the grids are held down against the bed plate by side guides 84 (Figs. 7 and 8) which engage the lugs 19 of the grids. These guides 84 are made of relatively thin, resilient material and are supported in desired spaced relation above the bed plate 44 by longitudinal bars 85. The vertical positions of the guides 84 may be varied by employing bars 85 of different thickness. The bars 85 are adjusted laterally to accommodate different widths of grids, and the bars 85 and the guides 84 are provided with slots 86, for hold-down bolts 87, so that they can be adjusted laterally.

As the grids are pushed past the hopper 17 (Fig. 3) a mechanism within and at the bottom of the hopper forces paste from the hopper into the interstices in the grids. This mechanism includes a roller 88 keyed to a shaft 89 supported in stationary bearings in the hopper 17 and so positioned that its lower portion almost contacts the grids moving along the bed plate 44. The surface of the roller has longitudinal flutes 90 therein for carrying paste, and has circumferential grooves 91 which are engaged by fingers 92 extending from the wall 93 of the hopper, (Fig. 13). The paste employed on battery plates is very thick and sticky, and the roller 88 carries an excess of the paste as it rotates, so that some of the paste is squeezed through the grids below the roller. This excess paste is forced back up against the underside of the grids by a smooth-surfaced roller 94 positioned immediately below the roller 88. This roller 94 is completely enclosed in a housing 95 so that paste cannot escape. After the machine has been in operation for a short time the entire space surrounding the roller 94 within the housing 95 becomes filled with paste.

To facilitate the maintenance of a coating of paste on the roller 88, an auxiliary roller 96 is positioned thereabove and almost in contact therewith. This roller 96 preferably has relatively thin circumferential corrugations therein to increase its paste-moving capacity. The roller 88 is driven counter-clockwise and the rollers 94 and 96 are driven clockwise, by a drive mechanism now to be described.

Figure 2:
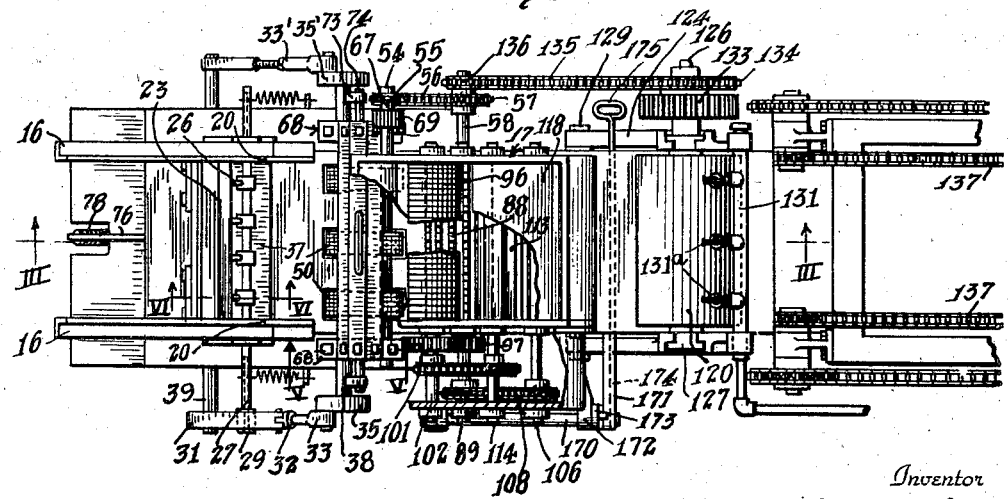
Fig. 2 is a plan view of the machine, with certain portions broken away.

Referring to Fig. 2, the shaft 89 on which the roller 88 is mounted extends forwardly from the hopper and has a gear 97 and a sprocket 98 thereon. The gear 97 meshes with a gear 99 on the shaft 58 on which the roller 94 is mounted, and also with the gear 101 (Fig. 1) on the shaft 102 on which the roller 96 is mounted. The shaft 58 is driven from the electric motor 63 in the manner previously described, so that this shaft drives the shaft 89 through the gears 101 and 97, and the shaft 89 in turn drives the shaft 102 through the gears 97 and 101.

The peripheral speeds of the roller 88 and of the roller 94 are substantially the same as the speed of travel of the grids therebetween.

After the grids leave the pasting rollers 88 and 94 they pass below a rigid smoothing blade 103, which tends to smooth the upper surface of the paste on the grids. This blade 103 is positioned to clear the bed plate 44 a distance exceeding the thickness of the grids by about .03 inch, so that after passing the blade 103 the grids carry excess paste, which must be removed. The excess paste is removed and the remaining paste compacted in the grids by a wiper roller 104 (Fig. 3) which is mounted on a shaft 106 supported in stationary bearings in the hopper and rotated in counter-clockwise direction. Thus there is mounted on the front end of the shaft 106 (Figs. 1 and 2) a sprocket 107 which is coupled by a chain 108 to the sprocket 98 on the shaft 89. The sprocket 107 is slightly smaller than the sprocket 98 so that the wiper roller 104 revolves slightly faster than the roller 88.

The wiper roller 104 is equipped with a large number of circumferentially spaced spring wiper blades 110 which bear against the grids as the latter move therealong. Since the roller 104 revolves slightly faster than the roller 88, the blades 110 move slightly faster than the grids against which they contact, so that the blades have a slow wiping motion against the grids. This movement of the blades over the grids compacts the paste in the grids and wipes the excess paste away so that after the grids leave the roller the surfaces of the paste in the interstices of the grids are flush with the outer faces of the grids.

The excess paste removed from the grids sticks to the ends of the wiper blades 110 as indicated at 111, and I provide means for returning this paste to the main supply in the hopper. Thus the blades 110 move past a stationary blade 112 which scrapes the accumulated paste 111 off each blade 110, the paste accumulating on the upper surface of blade 112. The paste that accumulates on blade 112 is removed therefrom by rotation of a flattened member 113 on a shaft 114, which is supported in stationary bearings in the hopper and has a sprocket 115 thereon which is coupled by a chain 116 to a sprocket 117 on the shaft 102. Therefore the member 113 is rotated in clockwise direction to repeatedly remove accumulations of paste from the stationary blade 112. These accumulations stick to the member 113 and are wiped off by rotation of the latter past a spring blade 118, which spring member forms a false wall within the hopper. The main body of paste is confined to the left of the blade 118.

After leaving the wiper roller 104, the grids move out from below the hopper along the bed plate 44 and are delivered between a pair of smoothing rollers 120 and 121, which iron out the surface of the paste on the plate. The lower roller 121 is mounted on a shaft 122 supported in journals 123 which are slidably mounted for vertical movement in slotted guide frames 124. Journals 123 can be adjusted vertically by means of screws 125. The upper roller 120 is mounted on a shaft 126 which is supported in journals 127 which are also slidably mounted in the vertical guides 124. The guides 124 are supported in arms 128 which are pivotally supported at 129 from the main frame of the machine and are supported at a desired elevation on adjusting screws 130. Means including a pipe line 131 (Fig. 1) and cocks 131a are provided to supply a little water or other liquid to the surface of the upper roller 120 to prevent the paste from sticking to it.

The shafts 122 and 126 supporting the rollers 120 and 121, respectively, have intermeshing gears 132 and 133 which force the rollers to rotate in opposite directions at the same speed, and the lower shaft 122 has a sprocket 134 on its rear end (Fig. 2) which is coupled by a chain 135 to a small sprocket 136 on the shaft 58. The sprocket 134 is substantially larger than the sprocket 136 so that the peripheral speed of the smoothing rollers 120 and 121 is substantially less than the speed of the grids passing therebetween. This causes the rollers to slide on the grids to produce the desired smoothing or ironing action.

As shown in Fig. 1, the grids after leaving the smoothing rollers 120 and 121 feed onto the chain conveyer 18. This conveyer 18 comprises (Fig. 2) a pair of chains 137 spaced apart a sufficient distance to engage the lugs at opposite ends of the grids so that the grids hang downwardly between the two chains. The chains 137 may extend through a drying chamber (not shown) so that the grids are dried as they are conveyed away from the pasting machine. However, in some plants a continuous drying chamber is not available and it is desired to deliver the pasted grids to racks, which can be transferred to a drying room or oven. A suitable type of rack is shown in Fig. 12 and consists simply of an open ended U-shaped trough 140 in which the upper edges of the side walls 141 are serrated, as indicated at 142 in Fig. 10, to space grids supported thereon.

I show in Figs. 10 and 11 a special conveyer mechanism for automatically delivering the pasted grids to racks 140 in spaced relation thereon. Thus in these figures the chains 137 overlie supporting tracks 143, which extend forwardly and downwardly. At their extreme forward ends the chains 137 extend around sprockets 144, thence rearwardly substantially horizontally over sprockets 145 on a shaft 146, thence downwardly over sprockets 147 on a shaft 148, thence upwardly over idler sprockets 149, after which they extend around rear sprockets 150.

Also mounted on the shaft 148 is a sprocket 151 which supports the rear end of a conveyer chain 152, the latter extending horizontally and being supported at its forward end by an idler sprocket 153. The upper reach of the conveyer chain 152 (which is supported by a plate 154) carries and moves the racks 140, the latter being centered by side guide members 155 so that the walls 141 of the rack are in vertical alignment with the two conveyer chains 137.

It will be noted that since the sprockets 147 engaged by the chains 137 and the sprockets 151 which drive the conveyer chain 152 are both secured to the shaft 148 and are of the same size, the chains 137 and the chain 152 travel at the same speed. Therefore, as the grids drop off the forward ends of the chains 137, the racks 140 are moved in synchronism to cause the lugs on successive grids to engage successive notches in the serrated upper edges 142 of the racks. Empty racks 140 are placed on the conveyer chain 152 at intervals as the filled racks are discharged off the forward end of the conveyer.

The grid-racking mechanism described is driven in synchronism with the pasting machine. To this end there is provided on the shaft 146 a pair of ratchet wheels 156 adapted to be engaged by pawls 157 on rocker arms 158 mounted for free rotation on the shaft 146 and coupled by connecting rods 159 to crankpins 160 on discs 161 secured to the opposite ends of the shaft 162. This shaft 162 has a sprocket 163 thereon which is driven by a chain 164 from a sprocket 165 on the shaft 38. As the rocker arms 158 are oscillated in one direction by the connecting rod 159 the pawls 157 engage the ratchet wheels 156 and rock the latter to a predetermined angle to advance the chains 137 and 152 the distance equal to the pitch of the notches in the racks 140, and as the rocker arms 158 return, the pawls 157 slip back over the ratchet teeth.

The hopper 17 is hingedly supported with respect to the bed plate 44 so that the entire hopper assembly can be readily lifted for inspection or servicing. Thus as shown in Fig. 1, a hinged shaft 170 is supported at opposite ends by lugs 171 on the main frame of the device and the shaft 170 is rotatably engaged by lugs 172 on the side of the hopper. As shown in the plan view of Fig. 2, the hinged shaft 170 is positioned in front of the gears 97 and 99 so that the gears do not prevent the upward swinging movement of the hopper. The rightmost lug 172 on the hopper has attached thereto a downwardly depending arm 173 (Fig. 1) which is pivotally connected to a link 174 (Fig. 2) extending across the machine and terminating in a handle 175 which can be grasped by the operator to facilitate the elevation of the hopper.

The operation of the machine may be briefly summarized as follows:

In response to each forward movement of the connecting rods 33 and 33' the grid last deposited from the rack rails 16 onto the plate 44 is advanced by the slide 37 (Fig. 3), and near the end of the advancing movement of the slide 37 the link 31 (Fig. 6) rocks the arm 29, the shaft 27 and the arms 26 to elevate the push rods 22 and lift the front grid on the rails 16 until its lugs are clear of the shoulders 20 (Fig. 3), whereupon the front grid swings down onto the bed plate, the lugs of the grid sliding along the arcuate lower ends 16a of the rails 16.

The forward feeding movement of the slide 37 moves the grid directly engaged thereby between the upper and lower conveyer chains 50 and 51, respectively (Fig. 3), which chains firmly grip the grids and positively move them forward toward the pasting mechanism.

As each grid moves between the pasting rollers 88 and 94, an excess of paste is deposited in the interstices of the grid and on the upper and lower sides of the grid. After the grid leaves the rollers 88 and 94, the stationary blade 103 smooths the surface of the paste deposited thereon. Then as the grid continues along under the wiper roller 104, the flexible blades 110 work the paste thoroughly into the interstices of the grids and wipe away the excess paste, after which the grids move out from below the hopper and between the ironing rollers 120 and 121 onto the conveyer.

The rotation of wiper roller 104 carries the flexible blades 110 thereon past the stationary blade 112 which scrapes the blades 110 clean of paste. Paste is periodically removed from the stationary blade 112 by the rotating element 113, which in turn is continuously scraped clean by the flexible blade 118 which constitutes a retaining wall for the paste in the hopper.

Although for the purpose of explaining the invention a specific embodiment thereof has been described in substantial detail, it is to be understood that various changes may be made in the particular construction shown without departing from the invention, which is to be limited only to the extent set forth in the appended claims.

I claim:

1. Apparatus of the type described comprising means supporting grids to be pasted for linear movement in a fixed path, means for moving grids along said path, means driven in synchronism with the movement of said grids for continuously forcing paste into grids as they move through said path, said pasting means comprising: a pasting roller positioned above said path with its lower surface in close proximity to the upper surface of grids moving along said path, means for supplying paste to the peripheral surface of said roller to transfer paste therefrom to grids moving therebelow, said pasting roller having peripheral grooves in axially spaced relation thereon, and said grid-supporting means comprising longitudinal rails for contacting the upper sides of grids as they move past said rollers, said rails being received in said peripheral grooves in said roller.

2. Apparatus of the type described, comprising a hopper, means for moving grids past said hopper, means for delivering excess paste from said hopper to said grids as they move therepast, wiper means, and means for moving said wiper means through a closed path against and then away from grids after they have had paste deposited thereon, said wiper means retaining paste it wipes from the grids, second wiping means engageable with the first wiper means to remove paste therefrom, third revolvable means for removing accumulations of paste from said second wiping means, and fourth wiping means engageable with said third means for wiping paste therefrom, said fourth means constituting a retaining wall for the paste supply in said hopper.

3. In an apparatus for applying paste to a grid, the combination of a paste hopper having a paste delivery throat, means for supporting and advancing a grid, which paste is to be applied below the throat, a paste applying roller mounted within the throat positioned above the grid, said roller having a paste accumulating surface for accumulating paste in the hopper and transferring an excess of paste to the grid and for feeding the paste through the grid, a smooth surfaced roller mounted below the grid at the throat for limiting extrusion of paste through the grid, means beyond the paste applying roller for wiping excess paste from the upper surface of the grid, and means operable in connection with the latter said means for removing the paste wiped from the upper grid surface, and returning the same to the hopper above the paste-applying roller.

4. Apparatus of the class described, comprising means for moving grids one after the other along a linear path, means at a predetermined point on said path for applying an excess of paste to the grids as they move therepast, means positioned beyond said paste-applying means for wiping paste from said grids as they are moved therepast, the latter said means comprising a rotatable member mounted for rotation about an axis transverse to the path of said grids, means for rotating said member, and a plurality of flexible blades on said member extending approximately tangential with respect to said axis for wiping against grids moved along said guide means therepast.

5. Apparatus of the type described, comprising means for moving grids one after the other along a linear path, means at a predetermined point on said path for applying an excess of paste to the grids as they move therepast, and means positioned beyond said paste-applying means for wiping said excess paste from said grids as they move therepast, the latter said means comprising a rotatable member mounted for rotation about an axis transverse to the path of said grids, means for rotating said member, a plurality of flexible blades moved by said member for bearing against and wiping the grids as the latter move along said linear path therepast, said rotating member rotating in such direction with respect to the movement of the grids that said flexible blades move past said grid in the direction of travel of the grids but at a faster rate.

6. An apparatus of the type described, comprising means for moving grids one after the other along a linear path, means at a predetermined point on said path for applying an excess of paste to the grids as they move therepast, and means positioned beyond said paste-applying means for wiping excess paste from said grids as they move therepast, said latter means comprising a plurality of flexible blades, means for supporting and moving said blades across and wiping grids moved along said path therepast, and means for removing paste from said wiping blades and returning it to said paste-applying means.

7. Apparatus of the type described, comprising means for moving grids one after the other along a linear path, means at a predetermined point on said path for applying an excess of paste to the grids as they move therepast, and means positioned beyond said paste-applying means for removing said paste from said grids as they move therepast, said latter means comprising a plurality of flexible blades, means for supporting and moving said blades in wiping relation to the grids, means for removing paste from said wiping blades and removing it to said paste-applying means including a stationary blade in the path of said flexible blades whereby the latter deposit their paste on the stationary blade, moving means for periodically wiping accumulated paste from said stationary blade, and means for scraping the paste from said last-mentioned means.

GEORGE A. DONATH.